Feb. 16, 1965   H. C. HARBERS ETAL   3,169,783
DRAWBAR HITCH ASSEMBLY
Filed July 30, 1962
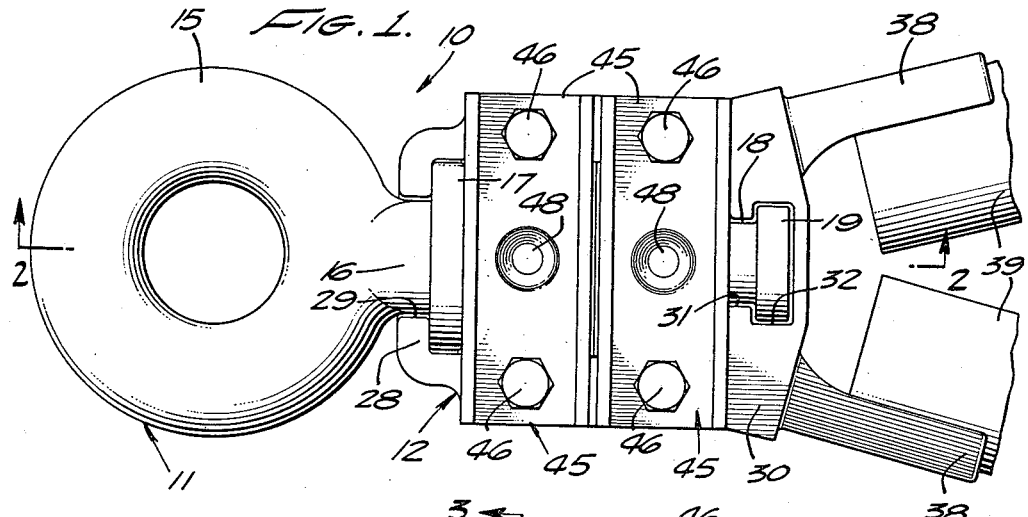
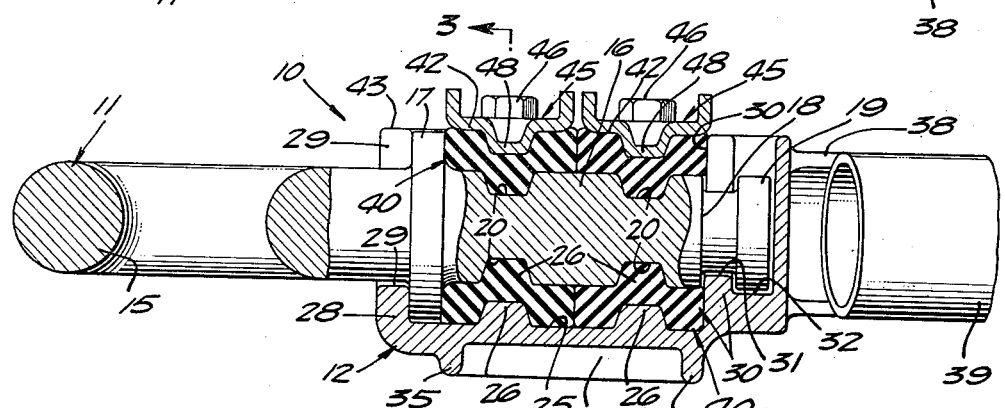
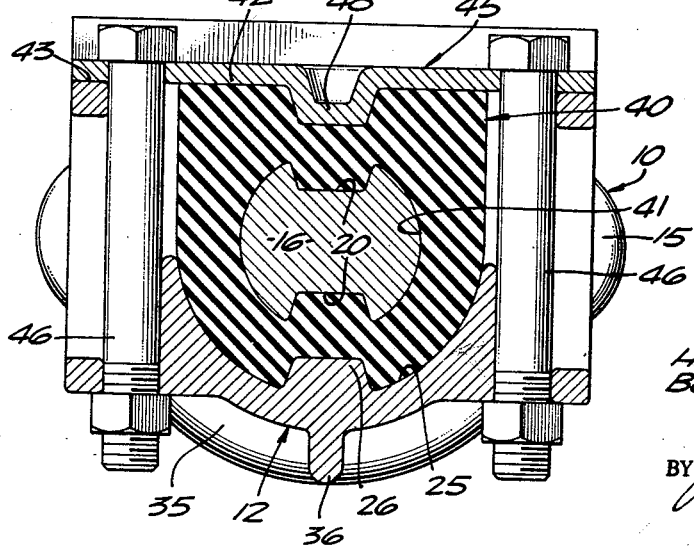
HENRY C. HARBERS
BUCK C. HAMLET
INVENTORS
BY
ATTORNEY

3,169,783
DRAWBAR HITCH ASSEMBLY
Henry C. Harbers, Pasadena, and Buck C. Hamlet, La Habra, Calif., assignors to Western Unit Corporation, City of Industry, Calif., a corporation of California
Filed July 30, 1962, Ser. No. 213,254
13 Claims. (Cl. 280—485)

This invention relates to vehicle drawbars and more particularly to an improved hitch assembly for attachment to the forward end of such drawbars and featuring two principal cast components held in assembled relation by means including torsion-resisting rubber bushings so arranged as to be subjected normally to constant loading.

Drawbar hitches of the type employed between tractor and trailer units customarily include an eye bolt attached to the trailer drawbar and arranged for coupling to the pintle portion of the hitch carried by the tractor unit. Desirably, some provision should be made for relative rotary movement between the eye bolt shank and the drawbar while normally maintaining the plane of the eye horizontal. Satisfying these needs necessitates adequate provision for relative movement between the eye bolt member and the supporting assembly therefor. Various constructions have been proposed heretofore to meet these needs but these are subject to disadvantage and shortcomings sought to be obviated by the present invention. For example, the provision heretofore made for relative movement leads to wear between the parts which occurs at an accelerated rate during the service life of the hitch and this leads to premature breakage or failure of the hitch assembly and serious consequences to life and property, particularly when occurring at higher operating speeds.

To avoid these consequences, it has been proposed to insert spring take-ups and rubber bushings and other expedients intended to provide for relative movement but under controlled and predetermined conditions. These proposals too have proven less than satisfactory. Designs employing rubber bushings are subject to cold flow of the rubber components and to overloading of these parts by the applied draft forces which typically are transmitted through the rubber. Other shortcomings involve inadequate provision for preventing lost motion between the hitch parts with the result that intermittent contacting of the metal surfaces occasions wear and eventually to overloading of the rubber or other snubbing components and to failure of one or more parts of the assembly.

Another shortcoming of prior drawbar hitch assemblies is the fact that the several components require time-consuming and expensive manufacturing procedures including among others the machining of the various parts. This is true even though the principal components are formed from so-called high tolerance castings.

By the present invention there is provided an inexpensive heavy-duty simplified drawbar hitch assembly having a minimum of components and the main members of which are preferably formed by casting and so designed as to be assembled with zero clearance without need for finish machining of any character. The two principal components, namely, the eye bolt and the main body used to connect the eye bolt swivelly to the drawbar, are formed from suitable casting, preferably steel, held assembled through rubber bushings and an adjustable pressure-applying preloading means formed from metal stampings and conventional machine bolts. The shank of the eye bolt is provided with a draft-transmitting collar integral with its forward or base end. The bolt shank rearwardly of this collar seats resilient rubber bushing means and this subassembly has a free but snug fit within a seating cavity formed in the main body casting. When the adjustable cover means is tightened against the rubber bushings, the latter are placed under axial and radial preload to hold the eye bolt collar firmly and resiliently seated against the forward end wall of the cavity at all times irrespective of the presence or absence of a draft load on the eye bolt. All draft forces are transferred directly from the main body member to the eye bolt collar independently of the rubber bushings reserving to the latter the functions of restricting relative rotary movement of the eye bolt and body member and that of holding the drafting transmitting surfaces constantly resiliently pressed together. It will therefore be appreciated that the present assembly provides for zero clearance make-up without need for machining operations on either of the two principal cast metal components.

Accordingly, it is a primary object of the present invention to provide an improved rugged drawbar hitch assembly having two principal cast metal components held assembled with zero clearance make-up without need for machining either of the principal components yet providing for relative rotary movement of these components when need arises.

Another object of the invention is the provision of a unique drawbar hitch assembly employing resilient rubber bushing means between the two principal components to resist relative rotary movement all without need for transmission of draft forces through the rubber bushings.

Another object of the invention is the provision of a drawbar hitch assembly which is easily assembled and disassembled from a minimum number of components and only the fastener components for which require machining and incorporating provision for relative movement between the parts when the need arises while normally preventing relative movement and including means for resiliently holding the main draft components in metal-to-metal contact.

Another object of the invention is the provision of a cast metal eye bolt for a drawbar hitch assembly made in one piece and having a draft-transmitting collar at its forward end and an emergency draft-transmitting collar integral with its rear end and including provision in the intermediate portion of its shanks for interlocking engagement with resilient rubber bushing means.

Another object of the invention is the provision of a cast main body for a drawbar hitch assembly requiring no machining and including provision for anchoring the same to the forward end of a vehicle drawbar.

These and other more specific objects will appear upon reading the following specification and claims and upon considering in connection therewith the attached drawing to which they relate.

Referring now to the drawing in which a preferred embodiment of the invention is illustrated.

FIGURE 1 is a plan view of a preferred embodiment of the drawbar hitch assembly incorporating the present invention;

FIGURE 2 is a longitudinal sectional view taken along line 2—2 on FIGURE 1; and

FIGURE 3 is a transverse sectional view on an enlarged scale taken along line 3—3 on FIGURE 2.

Referring to FIGURES 1 to 3, there is provided an improved drawbar hitch assembly designated generally 10 having as its two principal components a one-piece cast eye bolt and a one-piece cast main body 12. As here shown by way of example, eye bolt 11 includes a continuous ring eye portion 15 integral with the generally cylindrical shank 16. The forward or base end of shank 16 is provided with an integral draft-transmitting collar 17 of sufficient strength to transmit the full load of the vehicle being towed. The rear end of the shank is formed with a groove 18 thereby providing an alternate or emergency draft-transmitting collar 19 capable of transmitting the full towing load should there be failure of either main collar 17 or of the portion of the main housing 12 cooperating therewith. Additional features of the eye bolt shank include pairs of diametrically opposed recesses or indentations 20 provided on the opposite sides of the shank between collar 17 and groove 18. The purposes of these recesses will be explained in greater detail presently.

The body 12 of the hitch assembly is formed with a generally rectangular cavity 25 opening through one side wall as the upper side of the main body. Desirably, this cavity is of U-shape in cross-section as best appears from FIGURE 3. Projecting upwardly from the bottom wall of this cavity are bosses 26 generally complemental in shape to recesses 20, 20 in the sides of eye bolt shank 16. The forward end wall 28 of body member 12 is formed with a U-shaped opening 29 having a width slightly in excess of the diameter of eye bolt shank 16 and this opening extends upwardly through the top edge of the end wall which preferably lies in the plane of the open side of cavity 25, as is made clear by FIGURES 1 and 2. Likewise, the rear end wall 30 of cavity 25 is formed with a similar opening 31 having a transverse width slightly greater than the bottom diameter of groove 18 in the eye bolt shank. The inner end of opening 31 is enlarged as indicated at 32 to receive the emergency draft-transmitting flange 19 of the eye bolt. It will be understood each of the openings 29, 31, 32 have the same general configuration and open upwardly through the top side wall of main body member 12, thereby permitting the eye bolt subassembly to be inserted into and withdrawn from these cavities.

Main body casting 12 is suitably reinforced by appropriately positioned ribs indicated at 35, 36 and includes integral rearwardly projecting and diverging brackets 38, 38 to which suitable drawbar members, as tubes 39, 39, can be rigidly secured by welding or other appropriate means.

The torsion-resisting and resilient snubber means for holding the principal components assembled under preload stresses include elastomeric rubber bushing means here shown as formed in two identical molded parts designated 40, 40. However, it is pointed out that a greater or smaller number of bushing members can be employed. As made and before being assembled, each of these bushings is of identical shape and size. Each includes a cylindrical central bore 41 having a close sliding fit over eye bolt shank 16 and the lower half of each is of U-shape conforming with the shape of cavity 25 but lacks a recess to nest over bosses 26. It is also pointed out that the overall height of collars 40 is appreciably greater than the depth of cavity 25 with the result that the flat top surface 42 of the bushings projects appreciably above the top surface 43 (FIGURE 3) of main body 12 during the initial stage of the assembly operation both by reason of being supported initially on the flat top of bosses 26 and because their unstressed height is substantially greater than the depth of cavity 25.

The remaining components of the assembly include a cover or pressure applying plates 45, 45 and machine bolts 46. The pressure or preload applying plates 45 are desirably channel shape in cross-section and each include a depending boss 48 similar in size and shape to bosses 26 of the main body casting.

To assemble the described hitch components, the workman places the resilient rubber collars 40, 40 over the end of shank 16 pressing the collars forwardly along the shank until firmly seated against the rear face of collar 17. This subassembly is then inserted downwardly through the open top of cavity 25, care being taken to hold the plane of eye 15 parallel to the top surface 43 of the main body. The rough forward face of collar 17 will then fit snugly against the interior surface of end wall 28 and the rearwardly facing end of collar 40 will fit against the interior side wall of end wall 30. Also at this time bosses 26 will contact and support the semicylindrical lower surfaces of collars 40. The next step in the assembly operation is to place cover plates 45 against the flat top surfaces 42 of the bushings and to assemble the machine bolts downwardly through the aligned openings in the cover plates and in main body 12.

Tightening of the nuts on the lower end of the machine bolts will cause bosses 26 and 38 to press into the lower and upper surfaces, respectively, of the bushings thereby displacing these bushings into the depressions 20, 20 of the eye bolt. Additionally, as will be readily recognized, the tightening of the machine bolts causes the pressure applying plates to compress the rubber bushings radially and axially thereof placing portions of the rubber under preload and in high pressure frictional contact not only with the cavity surfaces but with collar 17 and with the rear end wall 30 of the main casting. When fully tightened cover plates 45 will lie close to the top surface 43 of the main casting and the rubber collars will be highly stressed and interlocked with depressions 20, 20 in the manner shown in FIGURES 2 and 3. The forward radial face of collar 17 will also be pressed rigidly against the interior surface of end wall 28 but no part of groove 18 or of emergency draft collar 19 will normally be in contact with cavities 31, 32.

The completed drawbar hitch assembly is now in readiness for operation in the usual manner. To be observed is the fact that the full draft load transmitted between drawbar members 39 and the tractor are transmitted via the front end wall 28 and collar 17 of the eye bolt through metal-to-metal contact of collar 17 with the end wall. No part of the draft load is transmitted through the rubber bushings 40, 40. Instead, the latter members are employed primarily to maintain collar 17 firmly and continuously seated against end wall 28. Additionally, the rubber collars strongly resist rotational movement of the eye bolt, this function being strongly augmented by the interlocking action of the collars with the eye bolt shank and with main housing 12 by reason of the cooperating action of recesses 20 with bosses 26, 38. However, if relative tilting of the trailer and tractor occurs for any reason, this movement is readily accommodated by distortion of resilient collars 40. Should one of these vehicles overturn, destructive shearing of the collars normally occurs without risk of damage to the far more costly metal components of the hitch assembly. The hitch assembly is economically and quickly reconditioned and returned to service by disassembly of the fastener bolts and the replacement of collars 40 with new ones.

Should failure of either main draft collar 17 or of forward end wall 28 occur, the hitch assembly remains in operation since the draft load is immediately absorbed by emergency draft collar 19 acting in cooperation with end wall 30. This emergency collar is not intended for continuous operation but prevents uncoupling of the towed vehicle and limited continued operation should there be failure of the normal draft-transmitting facilities at the forward end of the hitch assembly.

From the foregoing description of the assembly, it will be appreciated that no machining of any character is required of any part of the eye bolt or of the main body castings. On the contrary, these parts are cast to size in the usual casting manner and any tolerance variations are easily compensated for by the resilient collar means 40. The only surfaces of eye bolt 11 and main body 12 in contact with one another are the forward radial surfaces of draft collar 17 and the juxtaposed interior surfaces of end wall 28. Chafing or rubbing of these surfaces is negligible by reason of the action of the highly compressed rubber bushings 40, 40 the latter being aptly and appropriately described as zero clearance make-up means for holding the principal components accurately and positively assembled without need for machining.

While the particular drawbar hitch assembly herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

We claim:

1. A rubber-bushed drawbar hitch assembly comprising a main body casting having an elongated cavity opening through one side wall and one end wall thereof, said body casting being rigidly securable to a vehicle drawbar with said end wall opening facing forwardly of the vehicle, an eye bolt casting having a shank formed with a radial flange adjacent its connection to the eye portion thereof, preformed resilient rubber block means having a sliding fit over the shank of said eye bolt and shaped for assembly along with said eye bolt through the open side of said main body cavity and with said flange positioned against the inner side of the end wall formed with said opening, said rubber block means and said radial flange cooperating to substantially fill said cavity, and clamping means assembled over the open side of said cavity including adjustable fastener means for compressing said rubber block means radially of said eye bolt shank to expand said block means into high pressure frictional contact with said eye bolt shank and flange and against the interior side walls of said main body cavity thereby to resist rotational and axial movement of said shank and main body relative to one another, and said assembly being effective to transmit all drawbar draft forces through direct metal-to-metal contact between portions of said eye bolt casting and portions of said main body casting.

2. A drawbar hitch assembly comprising an eye bolt having a shank formed with radial flange means about the base end thereof sufficiently strong to transmit the draft load for which the assembly is designed, a main body member having a generally rectangular-shaped cavity therein opening through one side and through the forward end wall thereof, said eye bolt shank being receivable through the open side wall of said cavity with the radial flange means of said shank initially seating loosely against the inner edges of the forward end wall of said cavity and with the shank extending outwardly through said end wall opening, resilient rubber sleeve means assembled over said shank with one end bearing against said flange means and the other end bearing against the inner surface of the rear end wall of said cavity, and adjustable pressure means mounted across the open side of said main body for applying pressure to said rubber sleeve thereby to compress the same and expand portions thereof against said shank as well as against the side walls of said cavity, the juxtaposed surfaces of said flange means and the rear end wall of said cavity to hold said eye bolt shank in metal-to-metal contact with said main body member.

3. A drawbar hitch assembly as defined in claim 2 characterized in that said main body and said eye bolt comprise castings assembled together without machining surfaces of either casting.

4. A drawbar hitch assembly as defined in claim 3 characterized in that the opposite sides of said eye bolt shank are formed with depressions, and the bottom of said cavity and the oppositely-lying inner surfaces of said pressure means having bosses extending toward one another at points opposite the depressions in said shank and effective to depress portions of said rubber sleeve into interlocking engagement while compressing said sleeve means, said sleeve means being effective to resist rotation of said eye bolt about the axis of its shank and to hold said flange means seated resiliently in metal-to-metal contact with the forward end wall of said main body.

5. A drawbar hitch assembly as defined in claim 4 characterized in that said main body includes draft members integral therewith and projecting rearwardly from said rear end wall for rigid attachment to drawbar means.

6. A drawbar hitch assembly as defined in claim 2 characterized in that the rear end of said cavity and of the adjacent portions of said main body includes a portion complemental in shape to the juxtaposed portion of said shank, the end of said shank being grooved and mating with said complementally shaped portion of said cavity adjacent the rear end of said main body, said groove and the complementally shaped portions of the main body being normally out of contact and available to assume the draft load on the hitch assembly upon the fracture or failure of the draft transmitting members at the forward end of said assembly provided by said forward end wall and said flange means in contact therewith.

7. A drawbar hitch assembly comprising a main body casting having an opening in its front end wall, a cast steel eye bolt having the shank thereof extending lengthwise and centrally of said main body casting, said shank having an integral draft-transmitting collar at its forward end seated against the interior rim of said opening through the front end wall of said main body, resilient rubber means embracing said shank and the adjacent face of said collar, and means for placing said rubber means under compression axially and radially with respect to said eye bolt shank to hold said collar in continuous metal-to-metal contact with said front end wall and to resist rotation of said shank relative to said main body.

8. A drawbar hitch assembly as defined in claim 7 characterized in that opposed surfaces of said eye bolt shank and of said main body are formed with surface irregularities effective to deform the juxtaposed surfaces of said rubber means when compressed thereby to interlock therewith to resist relative rotary movement of said shank and main body.

9. A drawbar hitch assembly comprising a first member adapted to be attached to the forward end of a vehicle drawbar, a second member having a portion thereof disposed concentrically of a portion of said first member with portions of each in metal-to-metal contact and effective to transfer the draft force between said members when in use, said second member having means at its forward end to facilitate coupling the same to the rear end of a towing vehicle, and preloaded resilient rubber bushing means interposed between the concentrically related portions of said members and effective to resist relative rotary movement thereof and remaining under substantially uniform preload independently of the draft load forces acting on said members.

10. A drawbar hitch assembly as defined in claim 9 characterized in the provision of adjustable means adjusting the preload forces acting on said rubber bushing means.

11. A drawbar hitch assembly as defined in claim 9 characterized in that said preloaded rubber bushing means are effective to resiliently hold the metal-to-metal contacting surfaces of said members in pressure contact with one another independently of the presence of a draft load on said hitch assembly.

12. A drawbar hitch assembly as defined in claim 9 characterized in that both of said members are formed from cast steel and assembled as cast without machining.

13. A drawbar hitch assembly as defined in claim 12 characterized in the provision of means in said assembly for placing said rubber bushing means under preload stress and for pressing one casting into pressure contact with the other casting as respects said portions in metal-to-metal contact thereby providing for zero clearance make-up without need for machining said castings.

References Cited by the Examiner
UNITED STATES PATENTS

| | | | |
|---|---|---|---|
| 2,067,794 | 1/37 | Seyferth | 280—458 X |
| 2,189,170 | 2/40 | Gaussoin | 280—487 X |
| 2,340,786 | 2/44 | Winn | 280—486 X |
| 2,996,313 | 8/61 | Harbers et al. | 280—485 |

A. HARRY LEVY, *Primary Examiner.*

LEO FRIAGLIA, *Examiner.*